United States Patent Office 2,740,267
Patented Apr. 3, 1956

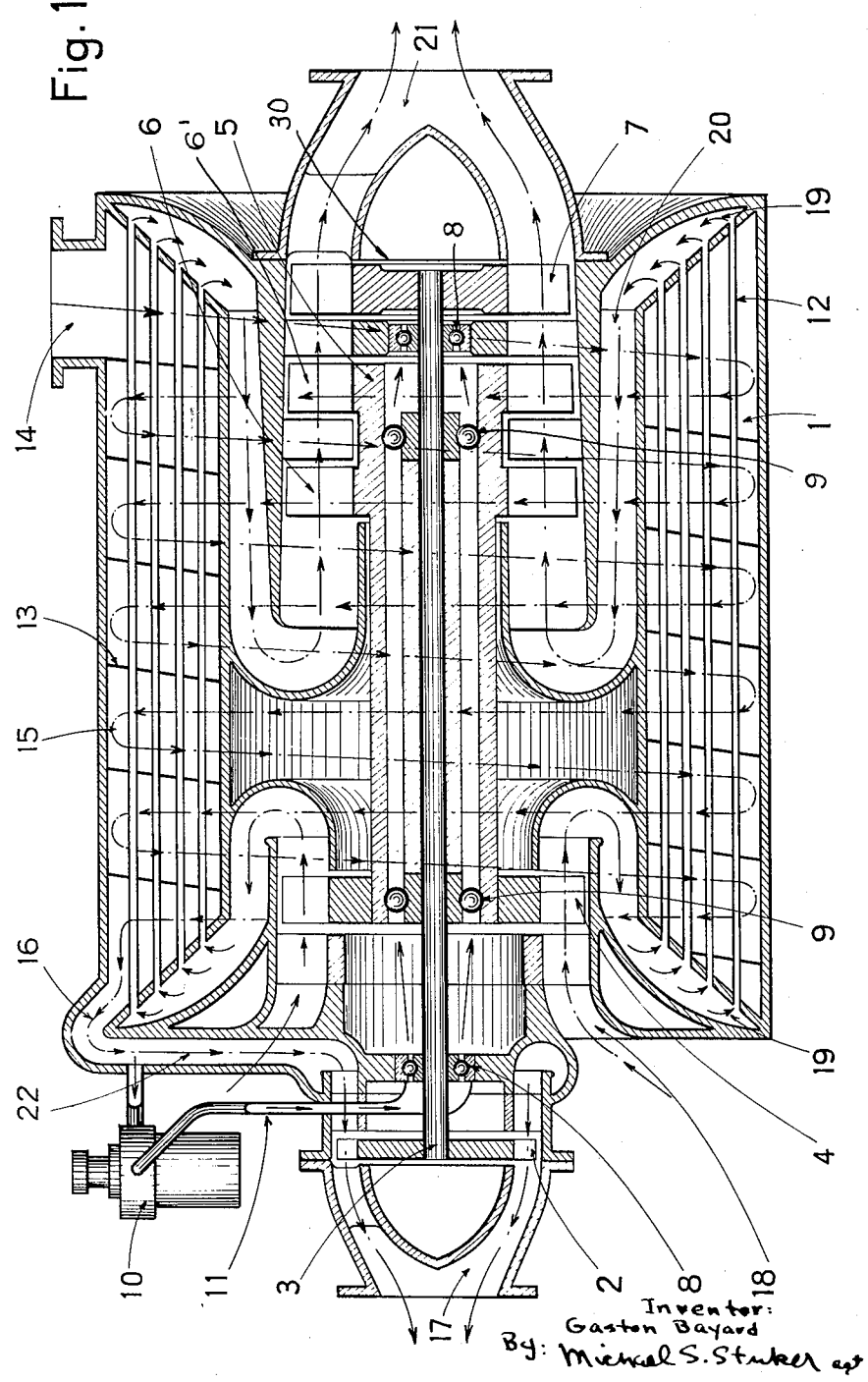

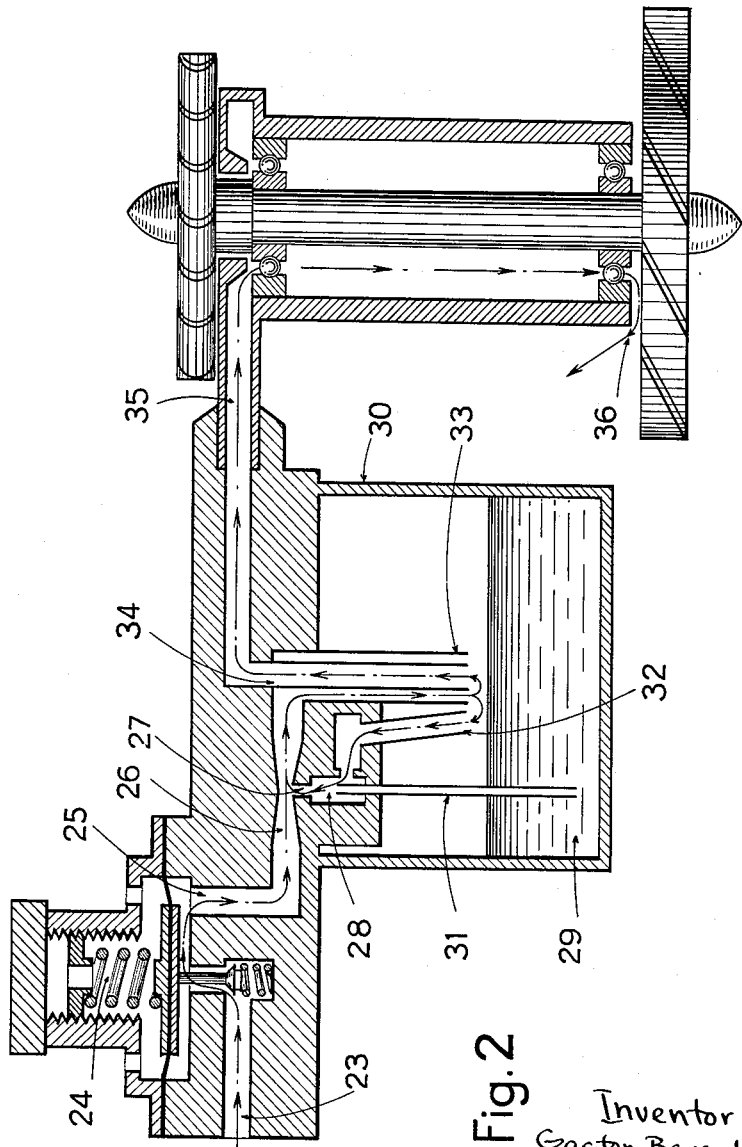

2,740,267
COOLING TURBINE SYSTEM
Gaston Bayard, Toulouse, France

Application May 4, 1953, Serial No. 352,847

Claims priority, application France March 4, 1953

11 Claims. (Cl. 62—136)

My invention has for its object improvements brought to air-cooling devices including heat-exchanging means and an expansion turbine, said improvements having for their object an increase in the efficiency and resistance to wear of such devices, while at the same time their weight and bulk are reduced. These improvements cover both the general design of a turbo-cooling group and the lubrication of its rotary parts.

It is a well known fact that the most efficient system for cooling air from a supply of compressed air and that requiring a minimum weight and bulk in the case of the cooling of large masses of air, consists in providing for an expansion of said compressed air after a preliminary cooling through exchange of heat with an auxiliary fluid, whether liquid or gasiform, at a lower temperature through a heat-exchanger.

The expansion of the air is provided inside a power unit, generally a turbine, the cooling system as a whole forming a turbo-cooler and feeding directly from its output any desired chamber with fresh air which I may term "conditioned air" and that can be used for any desired application, whether for cooling, air conditioning or drying. In particular, said chamber may be constituted by the cabin of an aircraft, to be fed with conditioned air. The auxiliary fluid may also be constituted by air, which I may term "cooling air" so as to distinguish it from the air to be cooled or conditioned.

The benefit to be obtained in such arrangements, from the standpoint of efficiency, as well as of bulk and weight, depends obviously on their design.

An object of my invention consists in resorting, in an air-cooling plant, to a double expansion, said expansion including a cooling expansion of the air to be cooled or conditioned and a cooling expansion of the cooling air as provided by resorting to the power produced by the two expansion turbines for sucking in the cooling air and increasing its expansion ratio.

According to a characteristic feature of the invention, this arrangement may be executed inside a system of unitary parts of a simple and compact shape operating independently and cutting out all external pipes with the exception, however, of the input and output pipes for the air to be cooled and for the cooling air, the rotary parts being housed wholly or partly inside the heat-exchanging means or being arranged directly in contact with the side walls of the latter.

The reduction in bulk and also in weight thus obtained in the execution of the plant makes the latter particularly suitable for the equipment of an aircraft.

A modification of the invention has for its object to provide a turbo-cooling set, the cooling power of which is further increased by reason of the contribution of external energy with a view to increasing the ratio of expansion in the cooling air circuit.

My invention has for its further object to obtain, by means of a current of air laden with a very small amount of very finely atomized oil, both an efficient lubrication of bearings revolving at a very high speed, of the type used in particular in cooling systems incorporating an expansion turbine, and a cooling of said bearings so as to improve their resistance against wear.

In order to ensure an efficient lubrication with a consumption of oil that is reduced to a minimum and consequently, in order to obtain a complete utilization of the oil fed to the bearings, it is necessary to subdivide said oil to a maximum by atomizing it as finely as possible. According to a further object of my invention, I use to this purpose a double atomizing system including two stages inserted in series and providing an atomization down to the extreme limit of possibilities: in the first stage, I provide a comparatively rough atomization, and in a second stage, I atomize again this mixture of air and oil by means of an additional amount of air so as to produce a dilution of oil in air in proportions providing optimum lubrication.

Further features and advantages of my invention will appear in the reading of the following description, reference being made to accompanying drawings. In said drawings, illustrating a preferred embodiment of my invention and given solely by way of exemplification:

Fig. 1 is a diagrammatic sectional view through a diametrical plane of the embodiment referred to, said section showing the arrangement of the different parts of the turbo-cooling system.

Fig. 2 is a diagrammatic showing of a lubricating system for high speed roller bearings incorporated to such a turbo-cooler, according to my invention.

The turbo-cooling set illustrated diagrammatically and cross-sectionally in Fig. 1, includes a hollow cylindrical body 1 constituted by heat-exchanging means inside which are located to one side a first expansion turbine 2 carried by a shaft 3 and a second expansion turbine 4 carried on a hollow shaft 5, coaxial with the shaft 3 while on the other side of the body 1 is provided an axial three-stage compressor 30, having rotor blades 6, 6′ and 7, this compressor also being referred to herein as a pump means. The rotors 6 of the two first stages are mounted on the hollow shaft 5 controlled by the turbine 4, while the third rotor 7 of the compressor is rigid with the shaft 3 of the turbine 2. The lubrication of the roller bearings 8 and 9 fitted between the hollow shaft 5 and the inner coaxial shaft 3 is ensured by the lubricator 10 and the oil-feeding pipe 11, the stream of oil-laden air passing in succession through the different roller-bearings and being finally exhausted into the outer atmosphere. The heat-exchanging means 1 include inner longitudinal pipes 12 and a transverse partition 13 extending spirally through the body 1 and carrying the pipes 12 in its perforations.

The compressed air to be cooled enters the chamber in the heat-exchanging means through the opening shown at 14 and flows in the direction of the arrow 15 over the convolutions of the spirally wound partition 13 and it passes out of the heat-exchanging means through the pipe 16 into the first expansion turbine 2 and thence through the pipe 17 towards the point of utilization, such as an aircraft cabin.

The cooling air enters the pipes 12 of the heat-exchanging means through the injectors 18 opening into the turbine 4 in which it expands and cools. The cooling air is then sucked in by the compressor 30 and enters as stated the longitudinal pipes 12 in the direction of the arrows 19. It is fed out of the heat-exchanging means through the annular pipe 20 into the successive stages 6 and 7 of the axial compressor which sucks it in and exhausts it through its output opening 21. An air tapping 22 in the pipe 16 feeding the first turbine 2 allows feeding the lubricator 10, the operation of which is described with further detail hereinbelow with reference to Fig. 2.

When starting the turbo-cooling set, the pressures at the input and at the output of the cooling air circuit are both equal to atmospheric pressure. If said atmospheric pressure is the same at both ends of the set, the cooling air does not circulate through the latter and the expansion turbine 4 is not actuated.

The expansion of the air to be cooled inside the turbine 2 controls the shaft 3 driving the rotor 7 of the axial compressor which latter delivers directly into the outer atmosphere so as to produce a depression in the circuit of the cooling air in its downstream end, which initiates thus an expansion of this cooling air through the turbine 4; the latter drives then the rotors 6 of the compressor through the agency of the hollow shaft 5.

The depression produced by the rotor 7 of the compressor on the circuit of the cooling air is thus still further increased and consequently, the ratio of expansion of said air through the turbine 4 is correspondingly increased. This increase of the expansion ratio acts in its turn on the speed of rotation of the rotors 6 of the compressor that are driven by the turbine 4.

The system including the turbine rotor 4 and the compressor rotor 6 is thus brought gradually to its normal running conditions for which the additional energy applied to the cooling air by the rotor 7 of the compressor, compensates exactly the total loss of energy in the circuit of cooling air inside the system formed by the turbine 4 coupled with the compressor rotors 6, said losses being produced both by the losses of head in the circuit and by the yields that are less than unity in each component of the system, to wit the turbine and the compressor.

The expansion of the cooling air inside the turbine 4 reduces its temperature and increases the efficient cooling power of the turbo-cooling set for predetermined speed conditions relating to the cooling air and to the air to be cooled.

Furthermore, the different cooperating parts of the above described arrangement are assembled so as to form with their pipes a compact unit the bulk and weight of which are reduced to a minimum.

Of course, this cooling power may be still further improved on an aircraft by feeding the cooling circuit with air under dynamic pressure, while its exhaust is provided against static pressure, which allows benefiting by an external contribution of power which leads to a more intense cooling of the cooling air and consequently to an increase in the cold-producing power of the unit.

The same results may be obtained, furthermore, in particular for stationary cooling plants, by coupling the turbo-compressing system operating on the cooling air with a motor the complementary energy of which allows increasing the ratio of expansion of the cooling air and consequently, its cooling power.

The preceding description has been given for a turbo-cooling set including an axial compressor; but, obviously, the latter may be replaced by a centrifugal compressor.

In the lubricating device operated by a stream of air laden with finely atomized oil, as illustrated diagrammatically in Fig. 2, the compressed air is admitted through the pipe 23 to expanding means 24 which keep the output pressure of the air at a constant value suitable for the operation of the arrangement. A pipe 25 feeds said air to a venturi 26 which produces a suction, through the port 27 opening therein, inside the chamber 28. This depression produces a suction on the oil 29 contained in the tank 30 which is urged through the pipe 31 into said chamber 28 inside which it is atomized and admixed with the air fed by the pipe 32.

The mixture thus formed is sucked in by the main stream of air through the opening 27 inside which is executed a second atomization and beyond which the mixture continues moving along the annular path 33 surrounding the downwardly extending pipe 34, the mixture producing on the walls of said annular passage a deposit of droplets that the mixture may carry along with it, said droplets falling back under the action of gravity inside the container 30. The air laden with atomized oil is then fed upwardly through the depending pipe 34 and the pipe 35 to the roller bearings and is finally removed into the atmosphere at 36.

The sizes of the different openings producing the two successive atomizations, i. e. the opening 27 in the venturi 26 and the cross-sections of the chamber 28 and of the pipe 31 are gauged in a manner such as to produce the desired relationship between the amount of oil carried along and the volume of air operating in the lubricating circuit.

The comparatively large amount of air operating in the circuit limits the heating of the roller bearings by reason of this air having been cooled by its previous flow through the heat exchanger 1.

The adjustment of the pressure at the output of the expanding means allows reducing to a minimum the throughput of air and consequently the consumption of oil, while it ensures optimum lubrication.

Obviously, my invention is not limited to the embodiments described and illustrated which are given by way of a mere exemplification and it covers all the modifications thereof falling within the scope of accompanying claims.

What I claim is:

1. Cooling system comprising, in combination, heat exchanger means having primary conduit means for a fluid to be cooled and a secondary conduit means for a cooling fluid, said primary and secondary conduit means being arranged for heat exchange between said fluids and each having an inlet and an outlet; drive means associated with said heat exchanger means and adapted to be driven by the fluid to be cooled passing through said primary conduit means; combined cooling and driving means in said secondary conduit means and adapted to be driven by the cooling fluid entering the inlet of said secondary conduit means and operable to cool the cooling fluid; and pump means comprising a pair of coacting pump components for sucking the cooling fluid through said secondary conduit means, one of said pump components being connected to and driven by said drive means, and the other pump component being connected to and driven by said combined cooling and driving means independently of said drive means and the pump component driven by the same.

2. Cooling system comprising, in combination, heat exchanger means having primary conduit means for a fluid to be cooled and a secondary conduit means for a cooling fluid, said primary and secondary conduit means being arranged for heat exchange between said fluids and each having an inlet and an outlet; drive means associated with said heat exchanger means; combined cooling and driving means in said secondary conduit means and adapted to be driven by the cooling fluid entering the inlet of said secondary conduit means and operable to cool the cooling fluid; and pump means comprising a pair of coacting pump components for sucking the cooling fluid through said secondary conduit means, one of said pump components being connected to and driven by said drive means, and the other pump component being connected to and driven by said combined cooling and driving means independently of said drive means and the pump component driven by the same.

3. Cooling system comprising, in combination, heat exchanger means having primary conduit means for a fluid to be cooled and a secondary conduit means for a cooling fluid, said primary and secondary conduit means being arranged for heat exchange between said fluids and each having an inlet and an outlet; drive means comprising a turbine associated with said heat exchanger means and adapted to be driven by the fluid to be cooled passing through said primary conduit means; combined cooling and driving means in said secondary conduit means and adapted to be driven by the cooling fluid entering the inlet of said secondary conduit means and operable to cool the cooling fluid; and pump means comprising a pair of coacting pump components for sucking the cooling fluid through said secondary conduit means, one of said pump components being connected to and driven by said drive means, and the other pump component being connected to and driven by said combined cooling and driving means independently of said drive means and the pump component driven by the same.

4. Cooling system comprising, in combination, heat exchanger means having primary conduit means for a fluid to be cooled and a secondary conduit means for a cooling fluid, said primary and secondary conduit means being arranged for heat exchange between said fluids and each having an inlet and an outlet; drive means associated with said heat exchanger means and adapted to be driven by the fluid to be cooled passing through said primary conduit means; combined cooling and driving means comprising a turbine in said secondary conduit means and adapted to be driven by the cooling fluid entering the inlet of said secondary conduit means and operable to cool the cooling fluid; and pump means comprising a pair of coacting pump components for sucking the cooling fluid through said secondary conduit means, one of said pump components being connected to and driven by said drive means, and other pump component being connected to and driven by said combined cooling and driving means independently of said drive means and the pump component driven by the same.

5. Cooling system comprising, in combination, heat exchanger means having primary conduit means for a compressed fluid to be cooled and a secondary conduit means for a cooling fluid, said primary and second conduit means being arranged for heat exchange between said fluids and each having an inlet and an outlet; drive means comprising a first turbine associated with said heat exchanger means and adapted to be driven by the fluid to be cooled passing through said primary conduit means; combined cooling and driving means comprising a second turbine in said secondary conduit means and adapted to be driven by the cooling fluid entering the inlet of said secondary conduit means and operable to cool the cooling fluid; and pump means comprising a pair of coacting pump components for sucking the cooling fluid through said secondary conduit means, one of said pump components being connected to and driven by said drive means, and the other pump component being connected to and driven by said combined cooling and driving means independently of said drive means and the pump component driven by the same.

6. Cooling system comprising, in combination, heat exchanger means having primary conduit means for a fluid to be cooled and a secondary conduit means for a cooling fluid, said primary and second conduit means being arranged for heat exchange between said fluids and each having an inlet and an outlet; drive means associated with said heat exchanger means and adapted to be driven by the fluid to be cooled passing through said primary conduit means; combined cooling and driving means in said secondary conduit means and adapted to be driven by the cooling fluid entering the inlet of said secondary conduit means and operable to cool the cooling fluid; and pump means comprising a pair of coacting pump components each including at least one rotor for sucking the cooling fluid through said secondary conduit means, the rotor of one of said pump components being connected to and driven by said drive means, and the rotor of the other pump component being connected to and driven by said combined cooling and driving means independently of said drive means and the pump component driven by the same.

7. Cooling system comprising, in combination, heat exchanger means having primary conduit means for a fluid to be cooled and a secondary conduit means for a cooling fluid, said primary and second conduit means being arranged for heat exchange between said fluids and each having an inlet and an outlet; drive means associated with said heat exchanger means and adapted to be driven by the fluid to be cooled passing through said primary conduit means; combined cooling and driving means in said secondary conduit means and adapted to be driven by the cooling fluid entering the inlet of said secondary conduit means and operable to cool the cooling fluid; first shaft means connected to said drive means for rotation thereby; second shaft means coaxial with said first shaft means connected to said combined cooling and driving means for rotation thereby; and pump means comprising a pair of coacting pump components each including at least one rotor for sucking the cooling fluid through said secondary conduit means, the rotor of one of said pump components being connected to said first shaft means so as to be driven by said drive means, and the rotor of the other pump component being connected to said second shaft means so as to be driven by said combined cooling and driving means independently of said drive means and the pump component driven by the same.

8. Cooling system comprising, in combination, heat exchanger means having primary conduit means for a compressed fluid to be cooled and a secondary conduit means for a cooling fluid, said primary and secondary conduit means being arranged for heat exchange between said fluids and each having an inlet and an outlet; drive means comprising a first turbine associated with said heat exchanger means and adapted to be driven by the fluid to be cooled passing through said primary conduit means; combined cooling and driving means comprising a second turbine in said secondary conduit means and adapted to be driven by the cooling fluid entering the inlet of said secondary conduit means and operable to cool the cooling fluid; first shaft means connected to said drive means for rotation thereby; second tubular shaft means surrounding and coaxial with said first shaft means connected to said combined cooling and driving means for rotation thereby; and pump means comprising a pair of coacting pump components each including at least one rotor for sucking the cooling fluid through said secondary conduit means, the rotor of one of said pump components being connected to said first shaft means so as to be driven by said drive means, and the rotor of the other pump component being connected to said second shaft means so as to be driven by said combined cooling and driving means independently of said drive means and the pump component driven by the same.

9. Cooling system comprising, in combination, heat exchanger means having primary conduit means for a compressed fluid to be cooled and a secondary conduit means for a cooling fluid, said primary and secondary conduit means being arranged for heat exchange between said fluids and each having an inlet and an outlet; drive means comprising a first turbine associated with said heat exchanger means and adapted to be driven by the fluid to be cooled passing through said primary conduit means; combined cooling and driving means comprising a second turbine in said secondary conduit means and adapted to be driven by the cooling fluid entering the inlet of said secondary conduit means and operable to cool the cooling fluid; first shaft means connected to said drive means for rotation thereby; second tubular shaft means surrounding and coaxial with said first shaft means connected to said combined cooling and driving means for rotation thereby; and pump means comprising a pair of coacting pump components each including at least one rotor for sucking the cooling fluid through said secondary conduit means, the rotor of one of said pump components being connected to said first shaft means so as to be driven by said drive means, and the rotor of the other pump component being connected to said second shaft means so as to be driven by said combined cooling and driving means independently of said drive means and the pump component driven by the same, said turbines and said rotors being coaxial with each other.

10. Cooling system comprising, in combination, heat exchanger means having primary conduit means for a fluid to be cooled and a secondary conduit means for a cooling fluid, said primary and secondary conduit means being arranged for heat exchange between said fluids and each having an inlet and an outlet; drive means associated with said heat exchanger means and adapted to be driven by the fluid to be cooled passing through said primary conduit means; combined cooling and driving means in said secondary conduit means adjacent the inlet thereof and adapted to be driven by the cooling fluid entering the inlet of said secondary conduit means and operable to cool the cooling fluid; and pump means comprising a pair of coacting pump components in said secondary conduit means adjacent the outlet thereof for sucking the cooling fluid through said secondary conduit means, one of said pump components being connected to and driven by said drive means, and the other pump component being connected to and driven by said combined cooling and driving means independently of said drive means and the pump component driven by the same.

11. Cooling system comprising, in combination, heat exchanger means having primary conduit means for a fluid to be cooled and a secondary conduit means for a cooling fluid, said primary and secondary conduit means being arranged for heat exchange between said fluids and each having an inlet and an outlet; drive means associated with said heat exchanger means and adapted to be driven by the fluid to be cooled passing through said primary conduit means; combined cooling and driving means in said secondary conduit means adjacent the inlet thereof and adapted to be driven by the cooling fluid entering the inlet of said secondary conduit means and operable to cool the cooling fluid; and pump means comprising a pair of coacting pump components in said secondary conduit means adjacent the outlet thereof for sucking the cooling fluid through said secondary conduit means, one of said pump components including a rotor connected to and driven by said drive means, and the other pump component including a plurality of rotors connected to and driven by said combined cooling and driving means independently of said drive means and the pump component driven by the same, said one pump component being arranged on the outlet side of said other pump component.

References Cited in the file of this patent

UNITED STATES PATENTS

| | | |
|---|---|---|
| 2,245,601 | Medaker | June 17, 1941 |
| 2,524,065 | Mayer | Oct. 3, 1950 |
| 2,613,067 | Goodyer | Oct. 7, 1952 |